United States Patent
Collins et al.

(10) Patent No.: US 11,760,069 B1
(45) Date of Patent: Sep. 19, 2023

(54) SYSTEMS AND METHODS FOR SELF-OBSCURING TAMPER-EVIDENT LABELS

(71) Applicant: Adcraft, Inc., Anaheim, CA (US)

(72) Inventors: Ken Collins, San Juan Capistrano, CA (US); Keith Mottram, Orange, CA (US)

(73) Assignee: Adcraft, Inc., Anaheim, CA (US)

( * ) Notice: Subject to any disclaimer, the term of this patent is extended or adjusted under 35 U.S.C. 154(b) by 0 days.

(21) Appl. No.: 16/917,895

(22) Filed: Jun. 30, 2020

(51) Int. Cl.
| | | |
|---|---|---|
| *B32B 27/08* | (2006.01) | |
| *B32B 3/02* | (2006.01) | |
| *B32B 7/14* | (2006.01) | |
| *B32B 27/32* | (2006.01) | |
| *B32B 27/30* | (2006.01) | |

(52) U.S. Cl.
CPC ............. *B32B 27/08* (2013.01); *B32B 3/02* (2013.01); *B32B 7/14* (2013.01); *B32B 27/302* (2013.01); *B32B 27/32* (2013.01); *B32B 2255/10* (2013.01); *B32B 2425/00* (2013.01); *B32B 2429/00* (2013.01)

(58) Field of Classification Search
CPC .. B32B 3/02; B32B 7/14; B32B 27/08; B32B 27/302; B32B 27/322; B32B 2255/10; B32B 2425/00; B32B 2429/00
See application file for complete search history.

(56) References Cited

U.S. PATENT DOCUMENTS

| | | | |
|---|---|---|---|
| 5,277,971 A * | 1/1994 | Weng | B32B 27/08 428/343 |
| 5,484,996 A | 1/1996 | Wood | |
| 5,691,023 A | 11/1997 | Keller | |
| 5,884,425 A | 3/1999 | Baldwin | |
| 2003/0158775 A1 | 8/2003 | Chaum | |
| 2007/0082148 A1 | 4/2007 | Wild et al. | |
| 2014/0110486 A1* | 4/2014 | Nemet | G01D 7/005 235/494 |

(Continued)

OTHER PUBLICATIONS

PCT/US2021/039972 filed Jun. 30, 2021 International Search Report and Written Opinion dated Oct. 13, 2021.

*Primary Examiner* — Travis M Figg
*Assistant Examiner* — Ethan Weydemeyer
(74) *Attorney, Agent, or Firm* — Rutan & Tucker, LLP

(57) ABSTRACT

Systems and methods for using, configuring, and manufacturing self-obscuring tamper-evident labels can include producing labels that have adhesive and non-adhesive sides. The non-adhesive side can be configured to receive printing such as machine-readable codes. The labels typically have multiple layers which can be configured for various tasks. For example, one layer can be configured as an irreversible void material that generates indicia upon receiving a certain tension associated with removal from a surface. Another layer may be configured to ease the removal of the label from a surface while another generates deformations under tension. The indicia, deformations, and machine-readable code printed on the non-adhesive side can be configured such that when activated, the indicia render the machine-readable code unreadable via machine. These labels can be utilized as security labels designed to indicate prior removal as well as other applications that can benefit from quick removal and prior removal indication.

20 Claims, 9 Drawing Sheets

(56) References Cited

U.S. PATENT DOCUMENTS

| | | |
|---|---|---|
| 2016/0280442 A1 | 9/2016 | Mottram et al. |
| 2020/0023612 A1 | 1/2020 | Roche |
| 2020/0090553 A1* | 3/2020 | Vanslette .............. G09F 3/0292 |

* cited by examiner

SYSTEMS AND METHODS FOR SELF-OBSCURING TAMPER-EVIDENT LABELS

The present disclosure relates to security labels. More particularly, the present disclosure technically relates to tamper-evident labels that indicate prior removal via indicia and/or deformations generated during the prior removal.

BACKGROUND

Stored value cards, which may also be known as gift cards, debit cards, loyalty or reward cards, identification cards, prepaid cards, shopping cards or fare cards, prepaid MasterCard™ and Visa™ cards among other names, have become increasingly popular with both consumers and retailers. However, as this interest in stored value cards has increased, so too has the criminal activity related to unauthorized taking of value within the stored value cards.

Once such type of criminal activity is to tamper with the stored value card prior to purchase and authorization. This type of scam can operate on stored value cards that contain sensitive information that is covered with a label or other covering prior to purchase. This type of crime typically includes a thief removing or tampering the label or covering to gain the sensitive information. The thief can then use that sensitive information to steal the stored value of the card after it is legitimately purchased by a customer.

For this type of crime to be successful, the tampering of the label or covering requires the tampering to be unnoticeable by the customer or the sale representative that typically processes the sale of the stored value card. As thieves have increased in sophistication, methods of tampering have also increased in complexity. This increased complexity has put more pressure on customers and/or sale representatives to notice the tampering. However, in many environments, the customer or sale representative may not have the attention span necessary to detect the tampering.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1A:
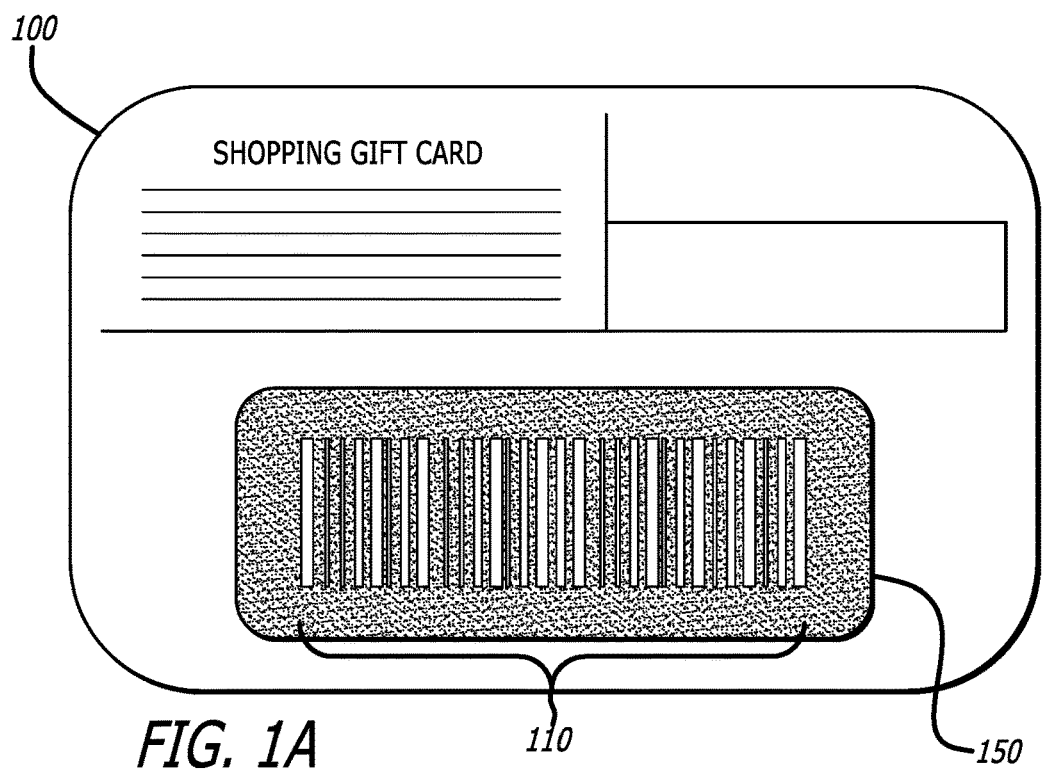
FIG. 1A is a conceptual illustration of a self-obscuring tamper-evident label applied to a stored value card in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, systems and methods are described herein for creating and utilizing self-obscuring tamper-evident labels. There are many systems wherein sensitive information printed on one or more materials should be protected from view until it is time for use. Stored value cards are one example of this type of use of sensitive information that can be compromised by others. In order to protect the sensitive information on one or more materials, self-obscuring tamper-evident labels can be utilized to first, cover up the sensitive information such that it is invisible under normal conditions and to second, indicate removal or tampering via one or more methods that will be unavoidable for detection if used within a proper validation system. Although the below discussions are directed to embodiments that utilize self-obscuring tamper-evident labels on stored value cards, it is contemplated that further embodiments can be realized in other technological fields including, but not limited to, medical applications, consumer products, and/or record keeping, etc.

This unavoidable detection can be achieved through printing one or more machine-readable codes on the self-obscuring tamper-evident labels. Next, when the label is tampered with or removed, the machine-readable code becomes unreadable by a machine. When this feature is placed within a system with validation, inadvertently failing to notice tampering indicia can be avoided. By way of example and not limitation, a stored value card can be tampered with prior to purchase, but the cashier or sales representative that is responsible for ringing up and charging the stored value card can be too busy to notice the indicia indicating prior tampering. However, if the point-of-sale or stored value charging system requires the reading of unique machine-readable code printed on the self-obscuring tamper-evident label, then validation cannot occur if tampering or removal has been previously done, whether the sales representative notices it or not.

Indeed, large chain stores can be tasked with processing and charging large volumes of stored value cards each day. Each transaction to sale and charge a stored value card can take a relatively long time compared to typical check-out items. Thus, large chain stores and retailers have an incentive to reduce the amount of time needed charging the stored value card, while also ensuring that fraud is not committed by selling and charging tampered stored value cards. Time saved for these stores can scale to incredibly large time-savings across each store within a chain. By utilizing a validation system that requires machine-readable code to be read by a machine, and self-obscuring tamper-evident labels that break the machine-readable code upon tampering or removal of the label can work in tandem to decrease fraud while increasing transaction and charging speed.

As shown in more detail below, the breaking of the machine-readable code can occur by creating and displaying indicia within the label that obfuscates or otherwise adds noise to the printed on machine-readable code such that the machine cannot read it anymore. In other embodiments, the breaking of the machine-readable code includes the physical tearing and/or deformation of the self-obscuring tamper-evident labels such that the broken structure of the printed on machine-readable code invalidates the readability of the code by machine.

These multiple functions, along with others described below, are achievable in many embodiments via the creation of a multi-layered self-obscuring tamper-evident label. The labels may be manufactured in large sheets and die-cut into rolls to sell to retailers and other users who can subsequently print any unique machine-readable code. As described in more detail below, the self-obscuring tamper-evident labels can be generated by creating multi-layered structures within the labels.

The description herein is not to be taken in a limiting sense but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1A, a conceptual illustration of a self-obscuring tamper-evident label 150 applied to a stored value card 100 in accordance with an embodiment of the invention is shown. As described above, the self-obscuring tamper-evident label 150 can be utilized in a number of ways. However, many embodiments of the disclosure can be utilized to cover sensitive information in stored value cards like the stored value card 100 depicted in FIG. 1. Sensitive information can be, but is not limited to, card identification numbers, account identification numbers, redemption codes, and/or directions to redeem the stored value. The self-obscuring tamper-evident label 150 can be placed over the sensitive information to keep it from being visible until the label is removed or otherwise tampered with.

As part of the redemption process, retailers of the stored value cards may imprint one or more machine-readable codes 110 on the self-obscuring tamper-evident label 150. While the machine-readable code 110 depicted in FIG. 1 is a barcode, other forms of machine-readable codes may be utilized including, but not limited to, quick response ("QR") codes, snap tags, color shape tags, augmented reality ("AR") reference points, near-field communication ("NFC") signals generated from an NFC circuit, United Parcel Service ("UPS") MaxiCodes, and/or any suitable data matrix.

Figure 1B:
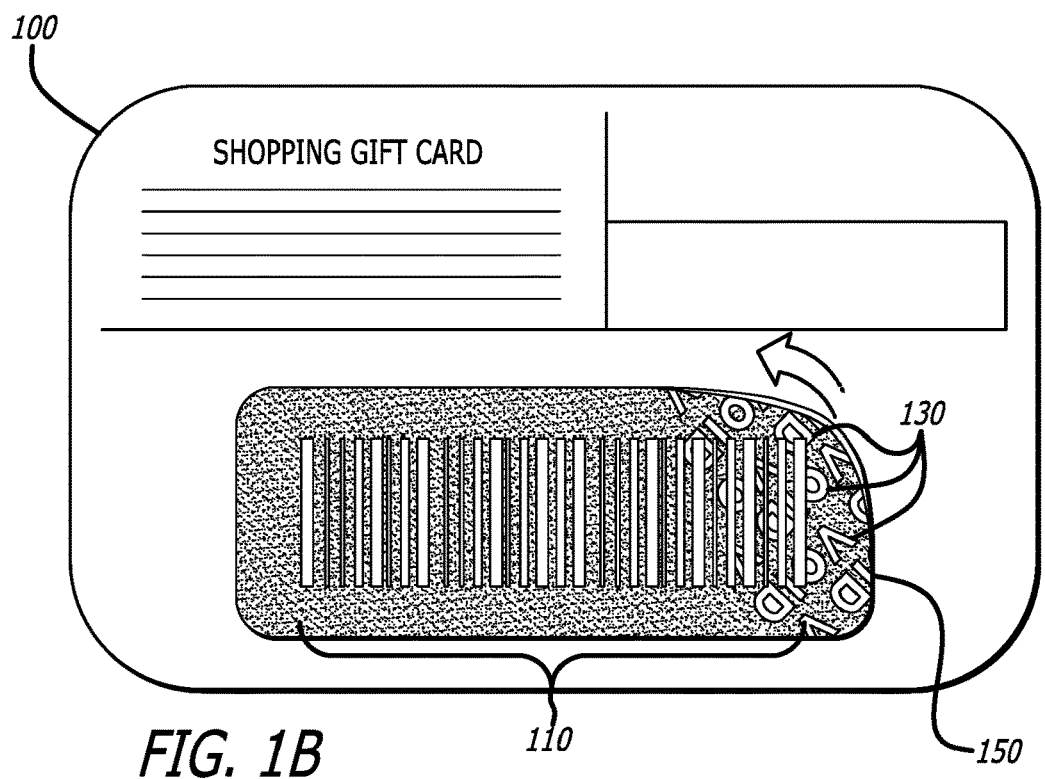
FIG. 1B is a conceptual illustration of a self-obscuring tamper-evident label being removed from a stored value card showing partial indicia in accordance with an embodiment of the invention.

Referring to FIG. 1B, a conceptual illustration of a self-obscuring tamper-evident label 150 being removed from a stored value card 100 showing partial indicia 130 in accordance with an embodiment of the invention is shown. In various embodiments, the removal of the self-obscuring tamper-evident label 150 will create a tension. The self-obscuring tamper-evident label 150 can be configured to trigger the display of a plurality of indicia 130 in response to undergoing the tension associated with removal of the self-obscuring tamper-evident label 150 from the underlying surface.

The self-obscuring tamper-evident label 150 depicted in FIG. 1B has been partially removed and is therefore displaying partial indicia 150 which manifests as a plurality of "void" words overlaid the section of the self-obscuring tamper-evident label 150 that has been partially removed. As those skilled in the art will recognize, the display of indicia 130 within a tamper-evidence label, much like that of an irreversible void label, can comprise any type of pattern, words, or shape as desired. The result of the display of the indicia 130 is that part of the machine-readable code 110 has been partially obscured. In some embodiments, the display of the indicia 130 does not simply obscure the machine-readable code 110, but instead creates added "noise" within the data being represented by the machine-readable code 110.

Figure 1C:
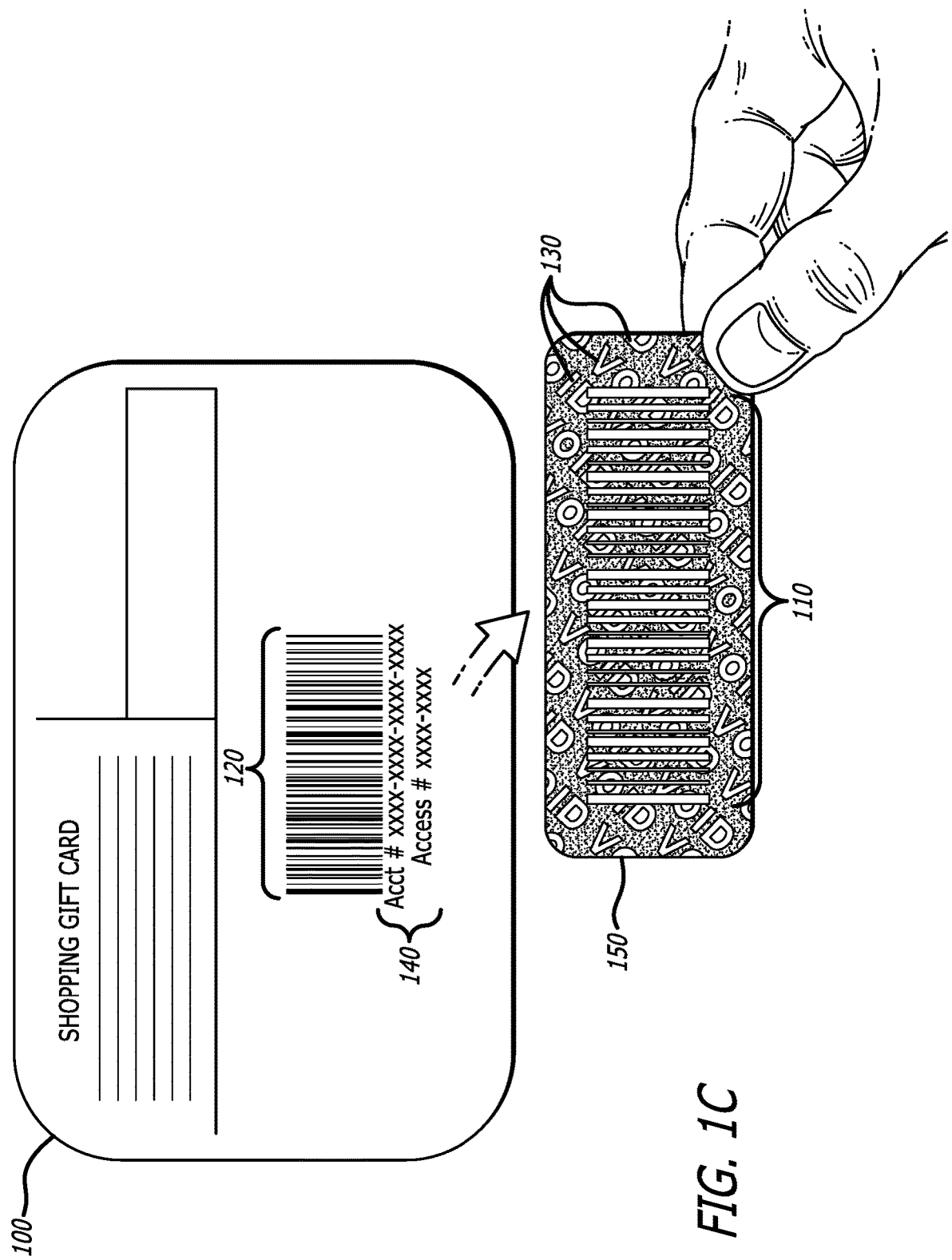
FIG. 1C is a conceptual illustration of a self-obscuring tamper-evident label removed from a stored value card showing full indicia in accordance with an embodiment of the invention.

Referring to FIG. 1C, a conceptual illustration of a self-obscuring tamper-evident label removed from a stored value card showing full indicia in accordance with an embodiment of the invention is shown. As depicted, FIG. 1C is an extension of the partial removing process shown in FIG. 1B. Specifically, the self-obscuring tamper-evident label 150 has been fully removed and separated from the stored value card 100 exposing sensitive information 120, 140 that was positioned underneath the initial location of the self-obscuring tamper-evident label 150.

As a result of the full removal of the self-obscuring tamper-evident label 150, indicia 130 has now been displayed over the entirety of the self-obscuring tamper-evident label 150. The machine-readable code 110 is now fully covered by indicia 130. In a variety of embodiments, this can represent a total or near total obfuscation. As described in more detail below, this process can make the machine-readable code 110 unreadable by machine.

The sensitive information depicted in FIG. 2 comprises both a machine-readable barcode 120 and one or more text-based identification numbers 140. It is contemplated that sensitive information 120, 140 that can be protected by a self-obscuring tamper-evident label 150 may include any number of encodings that can be read or otherwise utilized to provide unique access to the stored value card 100. Beyond machine-readable codes and alpha- numeric identifiers, sensitive information can be comprised of magnetic-readable data, pictures, and/or any other suitable method to convey the information necessary to provide access to the stored value card.

In many embodiments, a retailer of stored value cards may attempt to deter thieves by generating a unique machine-readable code 110 that is associated with each specific stored value card 100. This unique machine-readable code 110 can be utilized as a safety check against tampering. Specifically, prior to accessing the sensitive information 120, 140 on the stored value card 100 the retailer may require the sales representative to scan the unique machine-readable code 110 into one or more validation systems. In certain embodiments, a validation system can include a point-of-sale device utilized during a checkout process. In this way, the validation system may not allow a sales representative to continue with the sale of the stored value card if the machine-readable code 110 is not readable enough to be validated. Thus, when the machine-readable code 110 is obfuscated and/or degraded after the addition of noise to the readable area, the validation system will protect customers from purchasing stored value cards that have been tampered with. This process can occur without the knowledge or attention of the customer and/or sales representative as long as the validation system restricts further sales if the machine-readable code 110 is not readable.

Figure 2A:
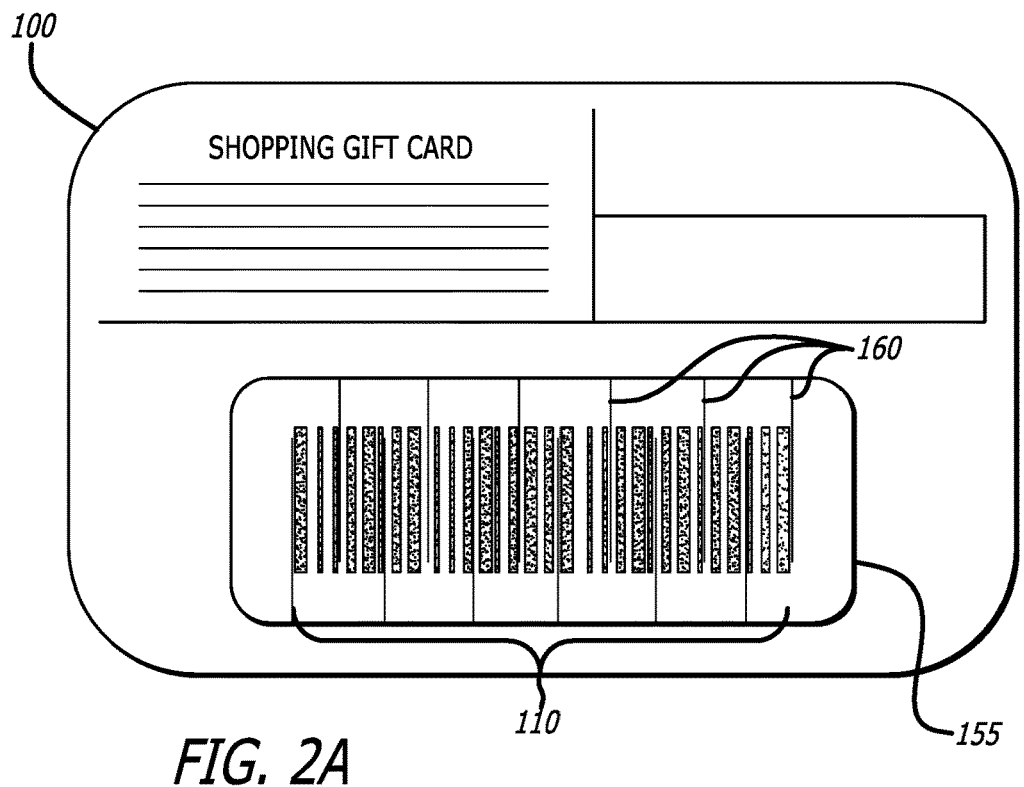
FIG. 2A is a conceptual illustration of a self-obscuring tamper-evident label with deformation die-cuts applied to a stored value card in accordance with an embodiment of the invention.
Figure 2B:
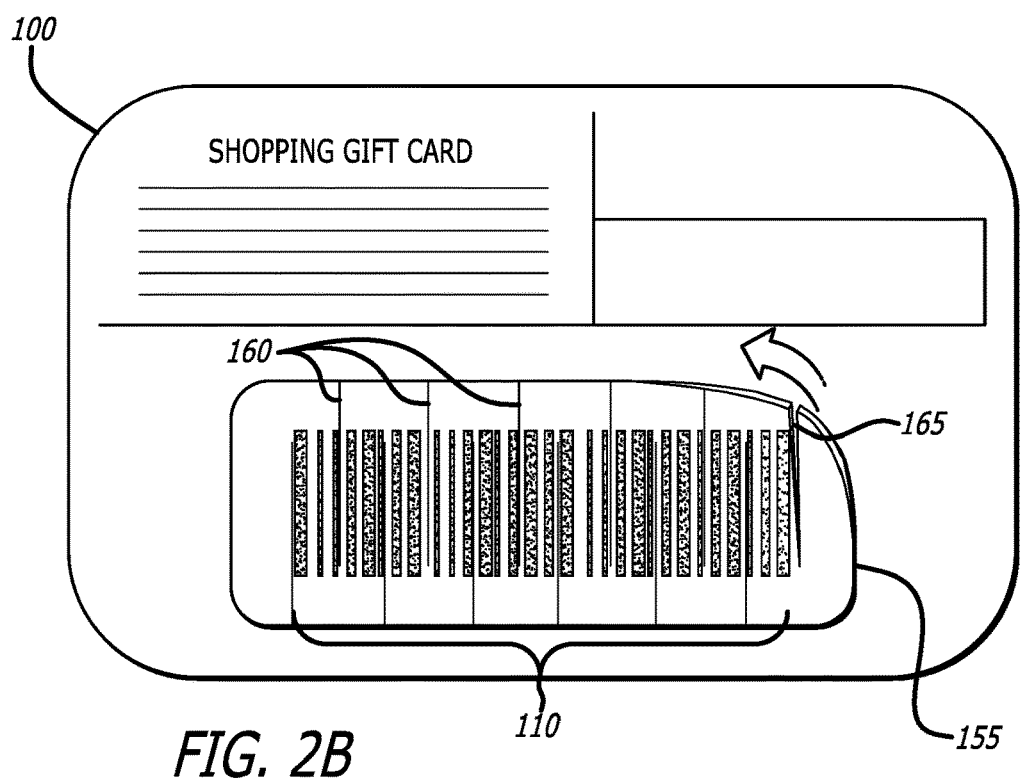
FIG. 2B is a conceptual illustration of a self-obscuring tamper-evident label being removed from a stored value card showing partial tears and deformation in accordance with an embodiment of the invention.
Figure 2C:
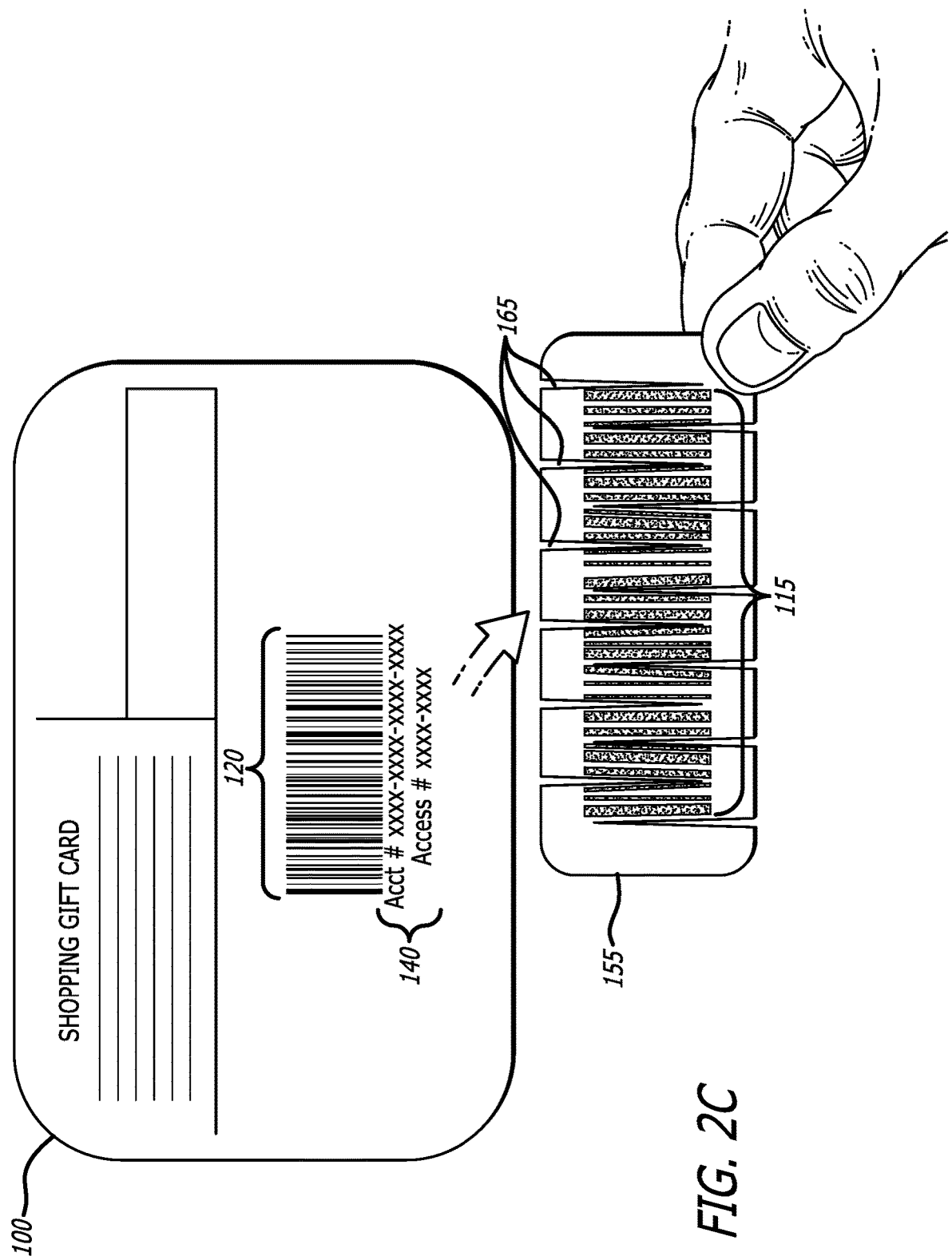
FIG. 2C is a conceptual illustration of a self-obscuring tamper-evident label removed from a stored value card showing full tearing and deformation in accordance with an embodiment of the invention.

Referring to FIG. 2A, a conceptual illustration of a self-obscuring tamper-evident label with deformation die-cuts 160 applied to a stored value card 100 in accordance with an embodiment of the invention is shown. While FIGS. 1A-1C depict embodiments of the invention that utilize indicia 130 to obfuscate or otherwise render machine-readable code 110 unreadable by machine, the embodiments of FIGS. 2A-C depict other embodiments that utilize one or more deformation cuts 160 within the self-obscuring tamper-evident label 155 to create tears and deformations in the label during removal. Prior to removal, the machine-readable code 110 is printed and intact on the self-obscuring tamper-evident label 155.

The deformation cuts 160 are shown as alternating along the length of each of the longer sides of the rectangular self-obscuring tamper-evident label 155. As will be shown in more detail within the discussion of FIG. 6B, the deformation cuts 160 may exhibit any number of patterns beyond what is depicted within FIG. 2A. Typically, the deformation cuts extend through the entire depth of the self-obscuring tamper-evident label 155 and are created using a die-cut process.

Referring to FIG. 2B, a conceptual illustration of a self-obscuring tamper-evident label 155 being removed from a stored value card 100 showing partial tears and deformation 165 in accordance with an embodiment of the invention is shown. During the removal process, the adhesion between the self-obscuring tamper-evident label 155 and the underlying stored value card 100 can be overcome through lifting of one end of the self-obscuring tamper-evident label 155. This removal generates tension within the self-obscuring tamper-evident label 155. This tension can be utilized to break apart or otherwise deform the portions of the self-obscuring tamper-evident label 155 that have been tampered with during removal.

The areas that have undergone removal can be configured to exhibit deformation and tearing 165. It is contemplated that various embodiments of the present disclosure can be configured to elicit various levels of tearing and deformation 165 based on the materials utilized within the self-obscuring tamper-evident label 155. For example, self-obscuring tamper-evident labels 155 that are made with materials that are more easily torn or deformed can be utilized with adhesives that require less tension to break. Conversely, as the materials within the self-obscuring tamper-evident label 155 increase in durability and/or elasticity, the amount of tension required by the underlying adhesive on the adhesive side must also increase to generate the required level of tearing and/or deformation to render the underlying machine-readable code 110 unreadable by machine in response to removal. However, it is contemplated that in a number of embodiments, retailers of stored value gift cards will have a desire to reduce the time required for removal of the self-obscuring tamper-evident label 155 during sale. In order to increase sale representative efficiency, a reduced tension level for triggering the obfuscation, tearing, and/or deformations necessary will likely be required.

Referring to FIG. 2C, a conceptual illustration of a self-obscuring tamper-evident label 155 removed from a stored value card 100 showing full tearing and deformation 165 in accordance with an embodiment of the invention is shown. Similar to FIG. 1C which extended the process of FIG. 1B, the embodiment depicted in FIG. 2C is an extension of the process started in FIG. 2B. Upon full removal, the tension created by pulling the self-obscuring tamper-evident label 155 off of the stored value card 100 has generated a full set of tears and deformations 165 which have changed the shape of the self-obscuring tamper-evident label 155 as well as deformed the machine-readable code 115.

In many embodiments, the deformation of the self-obscuring tamper-evident label 155 has created gaps within the deformed machine-readable code 115. Depending on the formatting, the deformed machine-readable code 115 will become unreadable by machine due to the tears and deformations 165. As described above in the discussion of FIG. 1C, the retailer may create a system wherein a validation machine is not able to process the sale of a stored value card 100 if the unique machine-readable code is not able to be read by machine. Similar to the indicia of FIGS. 1B and 1C, the tears and deformations 165 of the current embodiments provide a method to restrict validation of a stored value card after all or part of a self-obscuring tamper-evident label 155 has been removed or tampered with.

While one method of obfuscation is depicted in FIGS. 1A-1C and a second method of obfuscation is depicted in FIGS. 2A-2C, it is contemplated that some embodiments of the present disclosure can utilize both of these methods within the same self-obscuring tamper-evident label. In certain embodiments, utilizing both methods may be necessary to effectively obfuscate the machine-readable code printed on the label. Certain machine-readable codes have multiple parity checks or other error correcting methods that can allow for the reading of machine-readable code within noise or otherwise difficult circumstances. Embodiments of the present invention can be configured by retailers to account for these correcting methods by increasing the amount of obfuscation done during removal, which may include utilizing both indicia and deformations.

Figure 3:
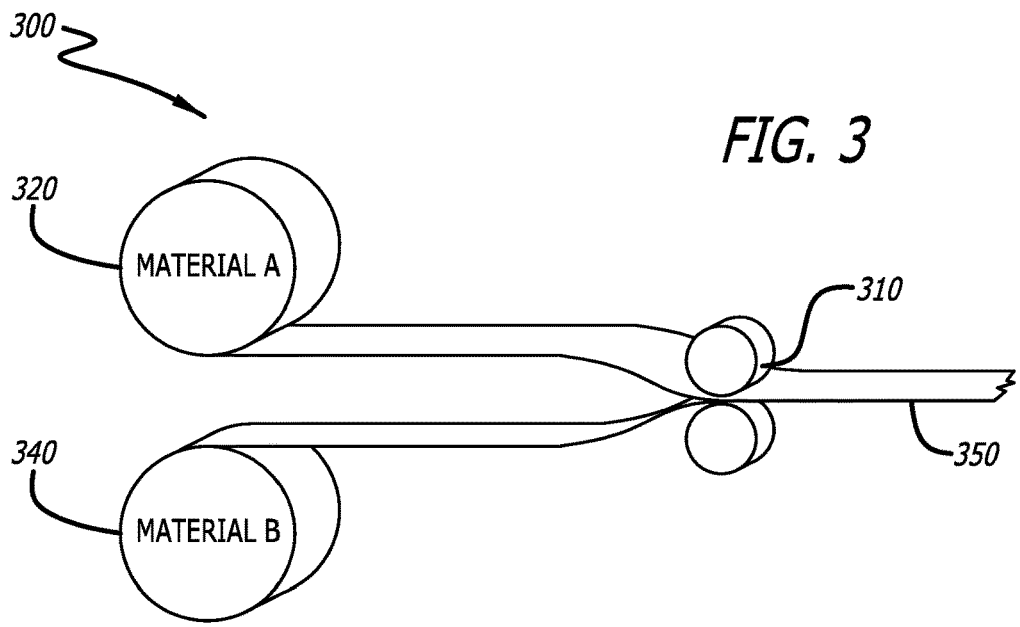
FIG. 3 is a conceptual illustration of two source materials being merged to create self-obscuring tamper-evident labels in accordance with an embodiment of the invention.

Referring to FIG. 3, a conceptual illustration of two source materials 320, 340 being merged 310 to create self-obscuring tamper-evident label sheets 350 in accordance with an embodiment of the invention is shown. Self-obscuring tamper-evident labels may be created by fusing one or more layers together. In a number of embodiments, these layers may come from multiple sources and may already contain one or more layers preconfigured for use. For example, the process 300 depicts a first material "Material A" 320 processed with a second material "Material B" 340. These two materials 320, 340 are merged 310 (depicted via a series of rollers within FIG. 3) to create a roll or sheet of self-obscuring tamper-evident labels 350. In certain embodiments, one or more materials are processed with one or more sides preconfigured with an adhesive layer that it utilized to adhere the merged materials together. Although depicted on a rolling assembly line, it is contemplated that the merging process 300 can be completed on any number of assembly lines or with a variety of other merging processes.

Figure 4:
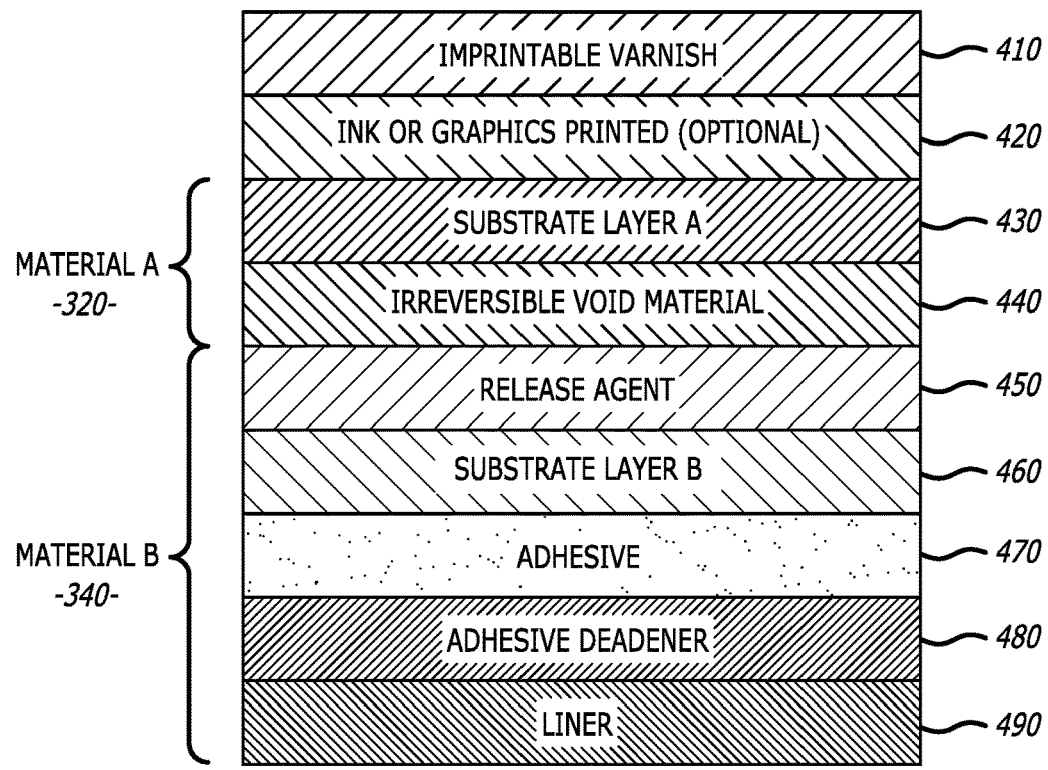
FIG. 4 is a conceptual illustration of the layers within a self-obscuring tamper-evident label in accordance with an embodiment of the invention.

Referring to FIG. 4, a conceptual illustration of the layers 410-490 within a self-obscuring tamper-evident label 400 in accordance with an embodiment of the invention is shown. As discussed above, many embodiments of the self-obscuring tamper-evident label 400 are composed of multiple layers. Further embodiments are processed as a merging between multiple materials such as a first material (i.e. "Material A") 320 and a second material (i.e. "Material B") 340 as described in more detail in the discussion of FIG. 3.

The embodiment depicted in FIG. 4 includes a merging between a first material 320 and a second material 340. The first material 320, when merged, comprises two layers 430, 440 while the second material 340 comprises five layers 440-490 when merged. The first material 320 may comprise a first substrate layer (i.e. "Substrate Layer A") 430 which is above an irreversible void material layer 440. As those skilled in the art will recognize, the first substrate layer 430 can be configured to act as a base layer to hold the other layers. Within the first material 320, the other layers attached to the first substrate layer 430 include the irreversible void material layer 440 which is configured to create and display the indicia suitable for obfuscating machine-readable code.

In a variety of embodiments, the first material 320 can be purchases from an outside vendor. Typically, when purchased from a vendor, the first material will be provided with at least one line layer. However, as the liner layer is not needed, it can be removed prior to application of the first material 320. This process is discussed in more detail within FIG. 5. Vendors can include any manufacturer of irreversible void material suitable for merging within a multi-layered self-obscuring tamper-evident labels 400. As those skilled in the art will recognize, an irreversible void material is preferred as the indicia are contained within the irreversible void material layer 440 and are not deposited to the underlying service to create the indicia such as in a standard void pattern label. A known suitable material for the irreversible void material layer 440 includes a 2-mil black non residue T.E. HDPE/RE3W/40 #with configured indicia by 3 Sigma of Troy, Ohio. In particular embodiments, it is desired that the configured indicia of the irreversible void material layer 440 include coloring that will closely match the imprinted machine-readable code in order to increase obfuscation.

The second material 340 includes a plurality of layers 450-490 that have been processed to merge with the first material 320. In many embodiments, the second material can begin processing as a pre-made product purchased from an outside vendor. These embodiments can utilize a product that includes a second substrate layer (i.e. "Substrate Layer B"), as well as a general adhesive layer 470 and liner 490. A known suitable material for processing in this manner includes the Fasson® 2-mil clear polystyrene/5246/40#SCK by the Avery Dennison Corporation of Glendale, Calif.. In a variety of embodiments, the use of a second substrate layer 460 that is comprised of polystyrene can be beneficial due to the presence of plasticizers utilized within many stored value cards. The presence of polystyrene can block any migration of the plasticizers which can prevent tampering of the release agent layer 450, which can create an increased or more permanent adhesion between the self-obscuring tamper-evident labels 400 and the stored value card.

Figure 5:
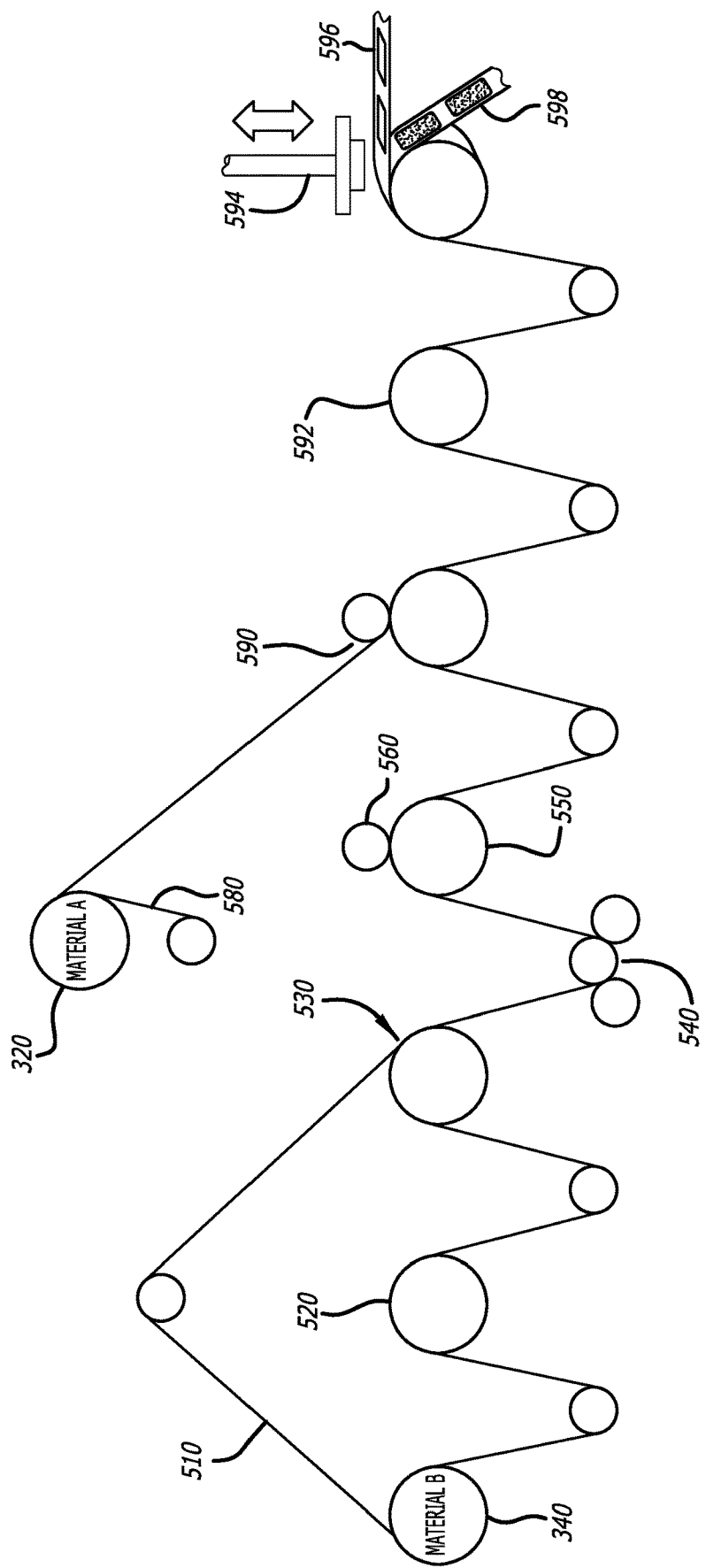
FIG. 5 is a conceptual illustration of the manufacturing process of self-obscuring tamper-evident labels in accordance with an embodiment of the invention.
Figure 6A:
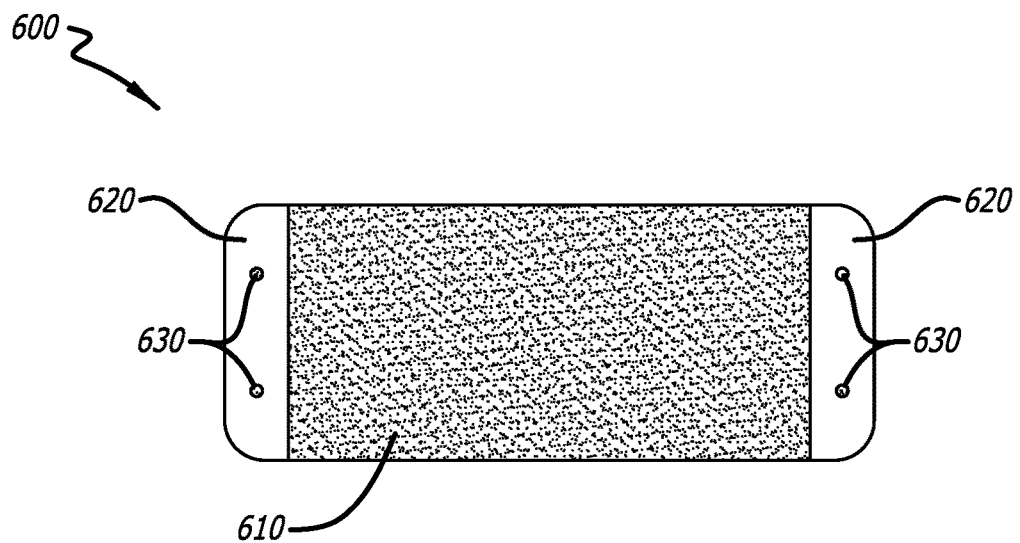
FIG. 6A is an illustration of the various adhesive and non-adhesive zones within a self-obscuring tamper-evident label in accordance with an embodiment of the invention.

In order to configure the adhesive layer 470 to provide for one or more non-adhesive zones as shown in FIG. 6A, the application of an adhesive deadener layer 480 is often required. For example, the adhesive deadener layer 480 can be applied to only a partial portion of the underlying adhesive layer 470 such that any pattern of adhesive and non-adhesive zones may be achieved. In a number of embodiments, the adhesive deadener layer 480 may comprise a varnish type material that can be applied to cover or otherwise negate the tackiness of the underlying adhesive layer 470. Prior to application of the adhesive deadener layer 480, various embodiments require the removal of the liner layer 490. As discussed above, a group of layers 460, 470, 490 within the second material 340 may come preassembled together. Therefore, the manufacturing process, as described in more detail within FIG. 5, can remove the liner layer 490 to provide access and time for the adhesive deadener layer 480 to be applied and cure before reapplication of the liner layer 490 occurs. In many embodiments, the adhesive deadener can include material such as the Enviro-Kote Gloss OPV from Siegwerk Druckfarben AG & Co. KGa of Siegburg, Germany which provides good adhesion and a rapid cure time.

Prior to merging with the first material 320, the second material 340 can have a release agent layer 450 applied on top of the second substrate layer 460. This release agent layer 450 can often be comprised of a customer mixture that is configured to properly adhere the first material 320 and second material 340 when merged. In a number of embodiments, the release agent layer 450 may be comprised of a silicon coating applied to the second substrate layer 460. When the release agent layer 450 is too weak, separation between the first and second material 320, 340 can occur during removal of the self-obscuring tamper-evident labels 400. If the adhesive layer 450 is too strong, the required tension to create and display the indicia within the irreversible void material layer 440 will be too great and fail to properly display upon removal of the self-obscuring tamper-evident label 400. Thus, the proper release agent layer 450 must provide a particular range of adhesion (i.e., surface energy upon removal) to properly function.

After application of the release agent layer 750, the first and second materials 320, 340 can be merged. After merging, the combined label can subsequently have any required ink or graphics printed 420 on top of the first substrate layer 430. However, this can be optional depending on the needs of the desired application. Finally, an imprintable varnish layer 410 is applied to the top of the self-obscuring tamper-evident label 400 creating a non-adhesive side and an adhesive side buffered by a liner layer 490.

During the process of generating the layers 410-490, the self-obscuring tamper-evident label 400 may undergo one or more die-cuts that can penetrate one or more layers. For example, an initial die-cut can occur during the processing of the second material 340 which can generate borders between the adhesive and non-adhesive zones. This die-cut can be configured to penetrate the second substrate layer 460 through the adhesive layers 470, 480. A second die-cut may occur to generate one or more deformation patterns. The deformation die-cut can occur after the merging of the first and second materials 320, 340 and before the printing the graphics 420 or adding the imprintable varnish 410. This die-cut can penetrate through all layers 430-480 down to the liner layer 490. However, further embodiments may only penetrate partial layers.

Referring to FIG. 5, a conceptual illustration of the manufacturing process of self-obscuring tamper-evident labels in accordance with an embodiment of the invention is shown. Although depicted as a roller-style manufacturing process, it should be understood that the arrangement, order, and/or positions of actions depicted herein are only for illustrative purposes and are not to be construed as limiting. For example, the single manufacturing line within FIG. 5 may in fact be implemented as multiple manufacturing lines and/or processes that are merged at various points prior to finalization. As those skilled in the art will recognize, additional methods exist that may produce the self-obscuring tamper-evident labels are described herein.

The manufacturing process can start or include the initial unspooling of a liner layer 510 from the second material (i.e. "Material B") 340. The liner layer 510 is removed and eventually returned to the second material 340 at 530. Between the removal and return 530, the second material 340 is processed by adding a layer of adhesive deadener at 520. As described below in the discussion of FIG. 6A, the initial adhesive layer of the second material 340 can be removed in a desired patter to provide additional functionality. The adhesive deadener can begin working prior to the return 530 of the liner layer 510. Once returned 530, the processed second material 340 can now be flipped 540 such that the substrate layer is now facing upward within the process instead of the liner layer.

Once flipped the second material can undergo two further operations. First, a custom release agent is applied over the substate layer of the second material 340. The customer release agent provides a method of merging/adhering the second material 340 to the upcoming first material 320. The custom release agent can be configured to further provide a correct amount of tension between the two materials 320, 340 such that tension applied during the label removing process will correctly transfer the necessary torque to the first material 320 to generate sufficient force to display the indicia. The release agent must also avoid separating the first and second materials 320, 340 during removal because the release agent is too weak.

A further operation is a die-cut performed on various embodiments. As shown in more detail in the discussion of FIG. 6A, this die-cut can create boundaries between adhesive areas and non-adhesive areas on the second material 340. This can be done to create easy lift tabs on the self-obscuring tamper-evident label which can aid sales representatives during stored value card sales by reducing the time required to locate a method to remove the label. While shown in FIG. 6A as two cuts, this die-cut can comprise any suitable shape, size, and/or number of cuts as necessary for the desired application.

In some embodiments, an eye mark may be added during this stage which will allow for subsequent die-cuts to be properly aligned and timed. As those skilled in the art will understand, the eye mark can be added and processed in a variety of ways depending on the type of manufacturing process/machine. For example, the manufacturing process may print self-obscuring tamper-evident labels on a wide continuous sheet that will have particular layers that should line up with a future die-cut process. The eye mark can allow future operations to be coordinated.

Next, the processed first material 340 is merged with the first material 320 on the manufacturing line 590. Prior to the merging 590, the first material can have its liner layer removed 580 as it will interfere with the merging of the first and second material 320, 340. As will be appreciated by those skilled in the art, many materials utilized in label printing may be obtained from outside vendors who typically provide a liner layer on their products for ease in processing. In these embodiments, the liner layer will need to be removed 580 such that it will not interfere with any merging processes.

Once merged, a further set of operations may occur. The number, type, and/or order may change based on the specific type of label being produced and the desired application of the label. Optional operations 592 can include applying one or more deformation die-cuts, printing optional graphics on the self-obscuring tamper-evident label, along with adding a final imprintable varnish layer.

Figure 6B:
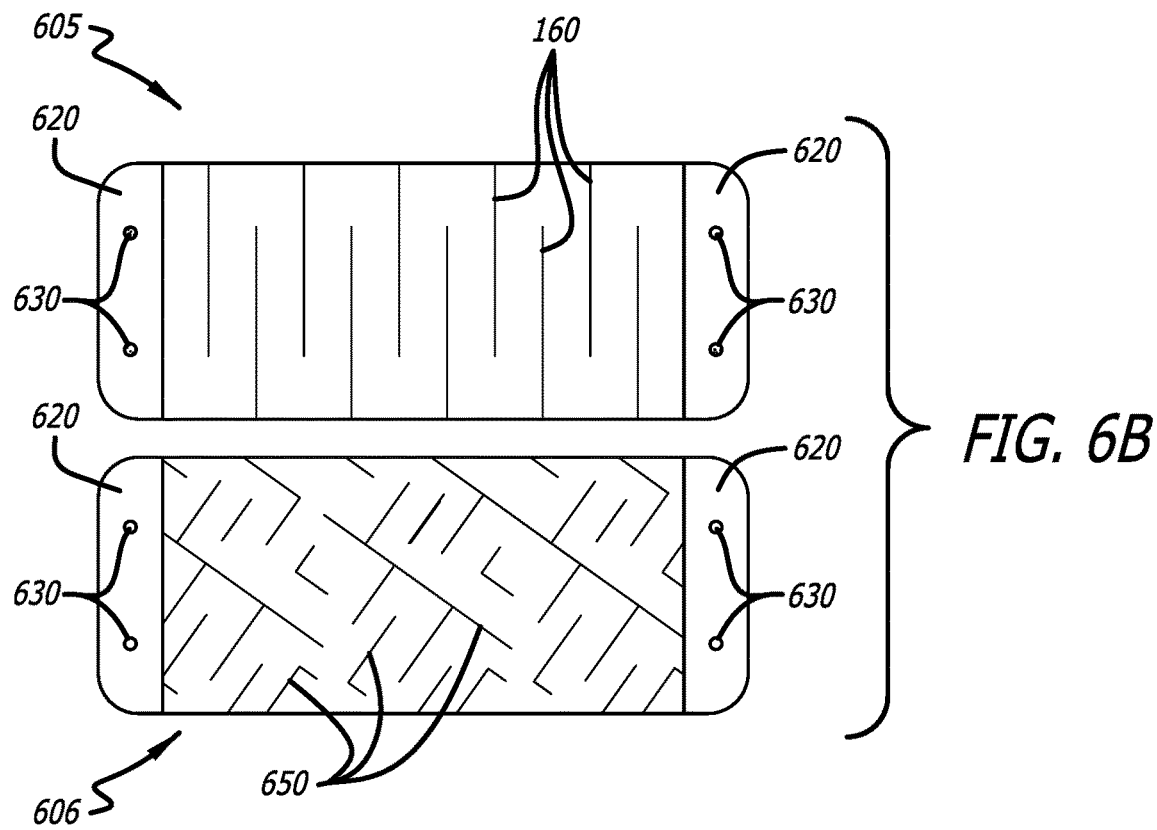
FIG. 6B is a conceptual illustration of various die-cut deformation patterns configured for self-obscuring tamper-evident labels in accordance with an embodiment of the invention.

As shown in more detail within the discussion of FIG. 6B, the deformation die-cuts within a self-obscuring tamper-evident label can include any variety or pattern desired such that the resulting tearing and deformation render the machine-readable code unreadable by machine. Depending on the machine-readable code used, the pattern or amount of deformation patterns required may be changed. Often, these patterns are die-cut into the label throughout the entire label or are placed specifically within a sheet, often in response to a processed eye mark.

Another optional operation 592 is to print graphics or other items on top of the self-obscuring tamper-evident label. In some embodiments, the printing of the machine-readable code may occur during manufacture. In more embodiments however, the printing of the machine-readable code will occur at another facility after manufacture. Typically, the self-obscuring tamper-evident labels can be packaged and sold blank and be subsequently printed on by the purchaser of the labels. For these embodiments, operation 592 is required to add an imprintable varnish layer that allows for future imprinting by a purchaser of the labels.

Finally, in a variety of embodiments, the manufacturing process can wrap up by stamping 594 areas within a larger sheet of multi-layered label material to generate a matrix 596 that can be removed from the processed self-obscuring tamper-evident sheets, to create a roll of fully processed and sale-ready self-obscuring tamper-evident labels 598.

Referring to FIG. 6A, an illustration of the various adhesive and non-adhesive zones 610, 620, 630 within a self-obscuring tamper-evident label 600 in accordance with an embodiment of the invention is shown. As described previously, the self-obscuring tamper-evident label 600 can initially have a uniform adhesive layer (i.e. "zone") 610 which covers the entirety of one side of a self-obscuring tamper-evident label 600. Then, based on desired applications, portions of the adhesive zone 610 may be removed through the use of a pattern of adhesive deadener.

In the embodiment depicted in FIG. 6A, the ends of the rectangular self-obscuring tamper-evident label 600 have non-adhesive zones 620. The borders between the adhesive zone 610 and the non-adhesive zones 620 may include die-cut border lines. In these embodiments, the non-adhesive zones 620 can act as an "easy-lift" portion of the label that can provide a method of easily grabbing and starting the removal of the self-obscuring tamper-evident label 600 from the underlying surface.

However, it may also be desired to retain the non-adhesive zones 620 to the underlying surface such that some tension is needed to remove the non-adhesive zones 620 from the surface. The tension to remove a non-adhesive zone is typically designed to be less than the tension required for full removal of the adhesive zone 610. In order to facilitate this, many embodiments of the invention can utilize one or more inner adhesive zones within the non-adhesive zones. In the embodiment depicted in FIG. 6A, this is achieved by creating a plurality of inner adhesive dots 630 within each non-adhesive zone 620. In this way, the non-adhesive zones 620 can remain attached to the underlying surface and will require a nominal force to displace the inner adhesive dots 630. Once removed, the non-adhesive zones 620, aided by the bordering die-cuts can flex and create an easier to grab tab on either end of the self-obscuring tamper-evident label 600.

Referring to FIG. 6B, a conceptual illustration of various die-cut deformation patterns 160, 650 configured for self-obscuring tamper-evident labels 605, 606 in accordance with an embodiment of the invention is shown. As discussed above, various embodiments can utilize a deformation die-cut pattern 160, 650 to generate tears and/or deformations during the removal process. FIG. 6B depicts two example deformation die-cut labels 605, 606. The first self-obscuring tamper-evident label 605 is shown from the adhesive side which include non-adhesive zones 620 and inner adhesive dots 630.

The internal area of the self-obscuring tamper-evident label 605 shows one embodiment as depicted in FIGS. 2A-2C above. The deformation die-cuts 160 include a plurality of straight lines alternating along the length of the adhesive zone. The second embodiment depicted shows a self-obscuring tamper-evident label 606 with a more intricate deformation die-cut 650. The deformation die-cut 650 is provided to indicate that deformation die-cuts can be configured to be any suitable shape or combination of cuts sufficient to render the machine-readable code that is printed on the non-adhesive side of the self-obscuring tamper-evident label 600 non-readable by machine. In certain embodiments however, deformation die-cuts may include patterns that, when fully deformed by removal of the self-obscuring tamper-evident label, comprise at least one uncut portion between both ends of the label, which can provide for uniform removal by a single motion.

It is understood that the depiction of self-obscuring tamper-evident labels 605, 606 in FIG. 6B are assumed to have adhesive zones within the non-adhesive zones 620 which are not shown in order to better highlight the deformation die-cuts 160, 650. Furthermore, the deformation die-cuts are depicted as going through the entirety of the self-obscuring tamper-evident label. However, certain embodiments may provide for deformation die-cuts that are only cut within a partial number of layers within the self-obscuring tamper-evident label. This may provide for further variety in deformations. The specific depth of deformation die-cuts can also be affected by order of operations within the manufacturing process.

Figure 7:
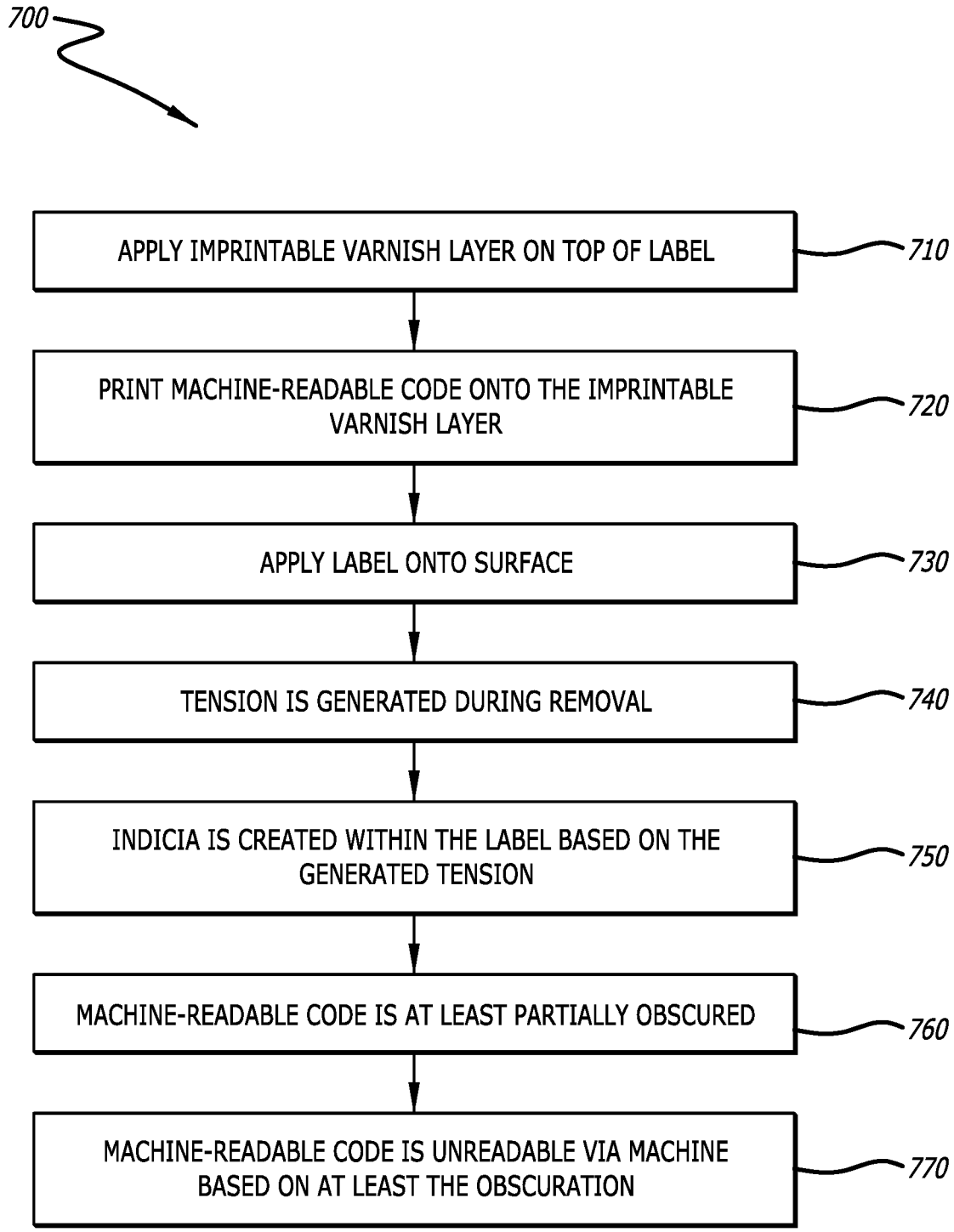
FIG. 7 is a flowchart depicting self-obscuring tamper-evident label usage with indicia obfuscation in accordance with an embodiment of the invention.

Referring to FIG. 7, a flowchart depicting self-obscuring tamper-evident label usage with indicia obfuscation in accordance with an embodiment of the invention is shown. The process 700 depicted in FIG. 7 is associated with various embodiments that utilize the generation of indicia similar to those depicted within FIGS. 1A-1C. Once the self-obscuring tamper-evident labels have been processed from merging the first and second materials (See FIGS. 3-5), the process 700 can begin by applying an imprintable varnish layer on top of the label (block 710). Once added, the labels can be sold to retailers for future use. In various embodiments, the retailers can print machine-readable code onto the imprintable varnish layer of the self-obscuring tamper-evident label (block 720). The printing can be done through any typical means, however the color of the ink chosen is typically selected from varieties that can yield the closest color to the indicia that will be displayed upon label removal. In this way, the obfuscation process can be amplified.

Once printed, the label may be applied to any desired surface (block 730). As discussed above, many embodiments of the invention contemplate that the applied surface will include a plastic stored value card. The second material substrate layer is often selected based on these embodiments which can prevent increased or permanent adhesion between the label adhesives and the material within the stored value card. Once applied, the label remains adhered during a typical shelf life, which can in many embodiments last over multiple years.

Once the stored value card is selected and the label is desired to be removed, the label adhesives generate a tension during removal (block 740). The irreversible void material within the self-obscuring tamper-evident label can change in response to undergoing this tension such that one or more indicia can be created and displayed (block 750). Depending on the amount of removal, some or all of the indicia may be displayed. Typically, the tension to create and display the indicia is only experienced by portions of the self-obscuring tamper-evident label that are lifted or otherwise separated from the underlying surface.

In response to the displayed indicia, the machine-readable code becomes at least partially obfuscated. As described in more detail in the discussion of FIGS. 1A-1C, the types of machine-readable code can vary greatly, and the type of obfuscation that can be generated, or is necessary to facilitate sufficient obfuscation can also change based on the desired application. The process 700 culminates when the machine-readable code becomes unreadable via machine based on at least the obfuscation (block 770). In this way, retailers can develop systems that avoid selling stored value cards to customers if the self-obscuring tamper-evident label has previously been removed, even partially in many embodiments.

Figure 8:
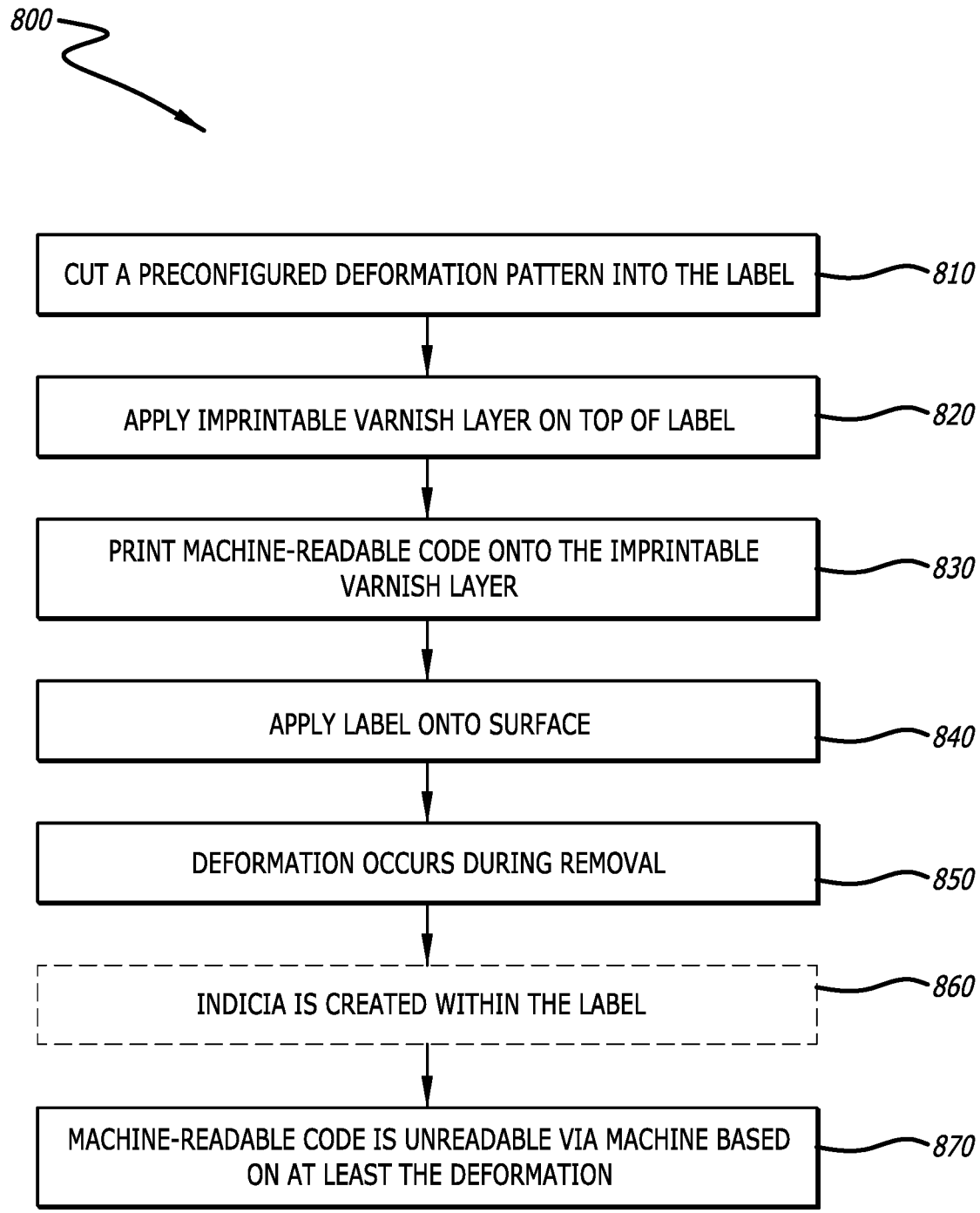
FIG. 8 is a flowchart depicting self-obscuring tamper-evident label usage with tearing and deformation obscuring in accordance with an embodiment of the invention.

Referring to FIG. 8, a flowchart depicting self-obscuring tamper-evident label usage with tearing and deformation obscuring in accordance with an embodiment of the invention is shown. The process 800 depicted in FIG. 8 is associated with various embodiments that utilize tearing and deformation similar to those depicted within FIGS. 2A-2C. Once the self-obscuring tamper-evident labels have been processed from merging the first and second materials (See FIGS. 3-5), the process 800 can begin by cutting one or more preconfigured deformation patterns into the label (block 810). Although a number of embodiments utilize preconfigured deformation patters, it is contemplated that a dynamically generated deformation pattern may be utilized for avoiding uniform applications that can be easily defeated via a secondary automated process or tool. In this way, each deformation pattern may present unique challenges to overcome for potential thieves.

Next, the process 800 applies an imprintable varnish layer on top of the label (block 820). Once added, the labels can be sold to retailers for future use. In various embodiments, the retailers can print machine-readable code onto the imprintable varnish layer of the self-obscuring tamper-evident label (block 830). The printing can be done through any typical means, however the type of ink and method of printing should take into account the deformation die-cuts within the labels such that premature tears or deformation are avoided during the printing process.

Once printed, the label may be applied to any desired surface (block 840). Once applied, the label remains adhered during a typical shelf life, which can in many embodiments last over multiple years without significant deformations along with deformation die-cuts. Once the stored value card is selected and the label is desired to be removed, the label adhesives generate a tension during removal that is sufficient to generate one or more tears or deformations (block 850). In some embodiments, an optional irreversible void material within the self-obscuring tamper-evident label can change in response to undergoing this tension such that one or more indicia can be created and displayed (block 860). Depending on the amount of removal, some or all of the deformation die-cuts may be torn or otherwise deformed. Typically, the tension to create tears and deformations is only experienced by portions of the self-obscuring tamper-evident label that are lifted or otherwise separated from the underlying surface.

In response to the deformations, the machine-readable code becomes at least partially obfuscated and/or unreadable (block 870). As described in more detail in the discussion of FIGS. 2A-2C, the types of machine-readable code can vary greatly, and the type of deformation that can be generated, or is necessary to facilitate sufficient obfuscation can also change based on the desired application. In this way, retailers can develop systems that avoid selling stored value cards to customers if the self-obscuring tamper-evident label has previously been removed, even partially.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A self-obscuring tamper-evident label, comprising:
an adhesive side configured to create a tension within the label upon removal from a surface;
a non-adhesive side configured to receive printing wherein the printing comprises machine-readable code;
a plurality of layers between the adhesive side and the non-adhesive side, wherein at least a first layer of the plurality of layers is positioned under the machine-readable code and above an adhesive located on the adhesive side and configured to generate and display, in response to the tension being applied from the adhesive side due to the removal of a portion of the label from the surface, additional printed indicia visible from the non-adhesive side; and
wherein the additional printed indicia is configured to render the machine-readable code unreadable via machine without altering a shape of the label.

2. The self-obscuring tamper-evident label of claim 1, wherein the additional printed indicia is visible under the machine-readable code and is located within an area associated with a portion of the adhesive side of the label being removed from the surface.

3. The self-obscuring tamper-evident label of claim 1, wherein the additional printed indicia is generated and displayed with the machine-readable code without deforming one or more barcodes forming the machine-readable code.

4. The self-obscuring tamper-evident label of claim 3, wherein the adhesive side is further configured to include at least two non-adhesive zones and each of the at least two non-adhesive zones is separated from at least an adhesive zone via a die cut.

5. The self-obscuring tamper-evident label of claim 4, wherein a corresponding non-adhesive zone of the at least two non-adhesive zones further comprises a plurality of internal adhesive zones.

6. The self-obscuring tamper-evident label of claim 5, wherein the plurality of internal adhesive zones are configured to reduce accidental lifting of the corresponding non-adhesive zone.

7. The self-obscuring tamper-evident label of claim 4, wherein the label comprises a rectangular shape.

8. The self-obscuring tamper-evident label of claim 7, wherein the at least two non-adhesive zones are positioned on opposing ends of the label.

9. The self-obscuring tamper-evident label of claim 5, wherein each of the at least two non-adhesive zones is created by applying an adhesive deadening pattern to the adhesive side.

10. The self-obscuring tamper-evident label of claim 1, being created by merging together a first multi-layer material and a second multi-layer material.

11. The self-obscuring tamper-evident label of claim 10, wherein the first multi-layer material comprises an irreversible void material that generates the additional printed indicia that obfuscates or otherwise adds noise to the machine-readable code printed on the non-adhesive side so as to preclude reading of the machine-readable code by a validation system.

12. The self-obscuring tamper-evident label of claim 11, wherein the first multi-layer material and second multi-layer material are merged together by a release agent adhesion, wherein the release agent is configured to retain the adhesion between the first multi-layer material and the second multi-layer material while also generating a tension sufficient to activate the additional printed indicia.

13. The self-obscuring tamper-evident label of claim 12, wherein the additional printed indicia associated with the irreversible void material layer features coloring that matches the machine-readable code in order to increase obfuscation.

14. The self-obscuring tamper-evident label of claim 10, wherein the second multi-layer material comprises a substrate layer.

15. The self-obscuring tamper-evident label of claim 14, wherein the substrate layer is a polystyrene layer.

16. The self-obscuring tamper-evident label of claim 10, wherein after merging the first multi-layer material and the second multi-layer material, the merged label is configured to receive printing on the non-adhesive side.

17. The self-obscuring tamper-evident label of claim 11, wherein after merging the two multi-layer materials, the merged label is configured to receive a varnish suitable for receiving subsequent printing.

18. The self-obscuring tamper-evident label of claim 1, wherein the additional printed indicia comprises a pattern generated on the non-adhesive side that causes the machine-readable code to be unreadable without the label tearing to alter the shape of the label.

19. The self-obscuring tamper-evident label of claim 1, wherein the additional printed indicia comprises a shape generated on the non-adhesive side that causes the machine-readable code to be unreadable without the label tearing to alter the shape of the label.

20. The self-obscuring tamper-evident label of claim 1, wherein the additional printed indicia comprises one or more words generated on the non-adhesive side that causes the machine-readable code to be unreadable without the label tearing to alter the shape of the label.

* * * * *